United States Patent [19]

Collins et al.

[11] Patent Number: 4,788,258

[45] Date of Patent: Nov. 29, 1988

[54] LOW TG NON-CRYSTALLINE ACETAL COPOLYMERS

[75] Inventors: George L. Collins, Maplewood; Paul Zema, Roselle Park; William M. Pleban, Stanhope, all of N.J.

[73] Assignee: Hoechst Celanese Corporation, Somerville, N.J.

[21] Appl. No.: 96,187

[22] Filed: Sep. 14, 1987

[51] Int. Cl.[4] .................. C08G 63/76; C08L 59/04
[52] U.S. Cl. .................. 525/414; 525/398; 528/230; 528/270
[58] Field of Search .............. 525/398, 414; 528/249, 528/230, 270

[56] References Cited

U.S. PATENT DOCUMENTS

| | | | |
|---|---|---|---|
| 3,194,788 | 7/1965 | Kullmar et al. | 260/67 |
| 3,297,647 | 1/1967 | Schott et al. | 260/67 |
| 3,337,507 | 8/1967 | Gutweiler et al. | 260/67 |
| 3,379,655 | 4/1968 | May et al. | 260/2 |
| 3,385,827 | 5/1968 | Fischer et al. | 528/249 |
| 3,422,035 | 1/1969 | May et al. | 260/2 |
| 3,497,992 | 11/1969 | Köcher et al. | 528/249 |
| 3,519,696 | 7/1970 | Cherdron et al. | 525/414 |
| 3,598,788 | 8/1971 | Burg et al. | 260/67 |
| 3,639,192 | 2/1972 | Burg et al. | 156/327 |
| 3,639,349 | 1/1972 | Burg et al. | 260/67 |
| 3,795,715 | 3/1974 | Cherdron et al. | 525/398 |
| 3,848,020 | 11/1974 | Burg et al. | 260/823 |
| 4,409,370 | 10/1983 | Froix et al. | 525/414 |

FOREIGN PATENT DOCUMENTS 42-22065 10/1967 Japan .

OTHER PUBLICATIONS

Unpublished Plastics Research Report No. 481, Dec. 15, 1987.
Unpublished Plastics Research Report No. 488, Apr. 18, 1968.
Unpublished Plastics Research Report No. 497, Jun. 20, 1968.

Primary Examiner—John Kight
Assistant Examiner—S. A. Acquah
Attorney, Agent, or Firm—Lyon & Lyon

[57] ABSTRACT

Low Tg copolymers of trioxane and 1,3-dioxolane which have a dioxolane content greater than 65 mol percent and less than about 75 mol percent and an IV of from about 1.0 to about 2.3, and which are non-crystalline at room temperature or above, are disclosed. These polymers, when blended with crystalline oxymethylene polymers, improve the latter's impact properties. They can also be used as adhesives for crystalline oxymethylene polymers.

21 Claims, No Drawings

LOW TG NON-CRYSTALLINE ACETAL COPOLYMERS

BACKGROUND OF THE INVENTION

1. Field of the Invention

This invention relates to novel acetal copolymers. More particularly, this invention relates to novel low Tg (glass transition temperature) copolymers of trioxane and 1,3-dioxolane which, by virtue of having higher dioxalane contents than hitherto contemplated in the prior art, are non-crystalline at room temperature (about 25° C.) or above, although they can be made to crystallize at temperatures below room temperature. These copolymers can be blended with conventionally prepared crystalline oxymethylene homo-, co- and terpolymers to improve the impact properties of molded articles made therefrom, and can also be used as adhesives for crystalline oxymethylene polymers as disclosed in commonly-assigned copending U.S. patent application Ser. No. 096,189, filed of even data herewith in the names of George L. Collins and Kurt E. Wissbrun.

2. Description of the Prior Art

Acetal or oxymethylene copolymers, including ones made from trioxane and dioxolane as the comonomer pair, are well known in the art. Such copolymers are characterized as having recurring oxymethylene groups or units, i.e., —$CH_2O$— groups, interspersed with oxy(-higher)alkylene groups or units, e.g., —$CH_2CH_2O$— groups. They may be prepared, for example, as described in Walling et al U.S. Pat. No. 3,027,352 by copolymerizing trioxane, the source of the —$CH_2O$— group, with a cyclic ether or cyclic formal having at least two adjacent carbon atoms, e.g., ethylene oxide, 1,3-dioxolane, 1,4-butanediol formal, and the like, in the presence of a catalyst, e.g., boron trifluoride diethyl etherate or the like.

Japanese Kokai Sho No. 42-22065, Yamada et al., published Oct. 30, 1967 discloses that the product of its Example 1, a trioxane/1,3-dioxolane copolymer, contained 64 mol % dioxolane, but says no more about this product.

Copolymers of 1,3-dioxolane and formaldehyde (which can be derived from trioxane) containing no less than 50 mol percent of oxymethylene units are disclosed in U.S. Pat. No. 3,639,347, issued Feb. 1, 1972 to Sugiura et al. These copolymers are disclosed as being in all cases tough, crystalline materials having melting points above 150° C.

U.S. Pat. Nos. 3,598,788 and 3,639,192, issued Aug. 10, 1971 and Feb. 1, 1972, respectively, to Burg, disclose trioxane copolymers containing major amounts (in each case up to 60 weight percent) of comonomers such as dioxolane or 1,4-butanediol formal. The U.S. Pat. No. 3,598,788, however, describes its polymers as ones which can be used for "injection molding, extrusion, or deep drawing", and as grindable solids having melting points ranging from 70° C. to 161° C. The U.S. Pat. No. 3,639,192 specifically describes a material that is "tough and solid" and heat-meltable.

U.S. Pat. Nos. 3,379,655 and 3,422,035, issued Apr. 23, 1968 and Jan. 14, 1969, respectively, to May et al., broadly disclose trioxane/1,3-dioxolane copolymers wherein dioxolane "will make up between 0.01 and 50% of the units of the polymer" (see the U.S. Pat. No. 3,379,655 at column 1, lines 37–69 and the U.S. Pat. No. 3,422,035 at column 1, lines 35–69). Each of these patents also contains a working example in which 30 grams of dioxolane is copolymerized with 0.9 gram of trioxane (see Example 8 of the U.S. Pat. No. 3,779,655; Example 4 of the U.S. Pat. No. 3,422,035). However, the polymers obtained in these two working examples are characterized as having melting points of 54°–55° C. and 51°–52° C., respectively (the polymer of Example 4 of the U.S. Pat. No. 3,422,035 was processed by being "broken up and milled in acetone"), indicating that they were crystalline solids at room temperature.

In Example 4 of U.S. Pat. No. 3,337,507, issued Aug. 22, 1967 to Gutweiler et al, ⅓ mol of trioxane was polymerized with 1 mol of dioxolane, using p-nitrophenyldiazoniumfluoroborate catalyst, to give a clear, highly viscous oil at 70° C. Upon cooling to room temperature, however, the polymer became a crystalline solid, since it was:

" . . . subsequently cooled in the polyethylene bag. The crystals were ground, boiled with methanol to which 1% of ethanol amine had been added and then dried."

U.S. Pat. No. 3,194,788, issued July 13, 1965 to Kullmar et al, discloses in its Example 6 the polymerization of 5 parts by weight of trioxane with 15 parts of diethylene glycol formal, using p-nitrophenyldiazoniumfluoroborate catalyst, to give a colorless, thickly liquid oil which solidified to a wax-like mass on standing. No indication is given that non-crystalline behavior was obtained or is possible in this polymer.

Various dioxolane-containing acetal terpolymers are also known. For example, U.S. Pat. No. 3,848,020, issued Nov. 12, 1974 to Burg et al, discloses a trioxane/dioxolane/1,6-hexanediol formal terpolymer in which these three monomers were used in a 55:35:10 weight percent ratio. The terpolymer obtained had a melting point of 70° C., indicating that it was a crystalline polymer.

U.S. Pat. No. 3,693,349, issued Feb. 1, 1972 to Burg, discloses trioxane/dioxolane/polyethylene oxide terpolymers which contain up to 60 weight percent dioxolane and may also contain a minor amount of a formal, glycidyl ether or prepolymer component. Polymers having "very good impact toughness coupled with good stability to alkalies" were obtained.

Trioxane/dioxolane/unsaturated diol formal terpolymers are disclosed in U.S. Pat. No. 3,297,647 to Schott et al. The patentees have this to say about their polymers:

"The physical properties of the terpolymers can be varied within wide limits and depend, on the one hand, on the nature and concentration of the saturated cyclic formal or saturated cyclic ether and, on the other hand, on the concentration of the formal of an unsaturated cyclic diol.

For example, when 0.1 to 10% by weight, calculated on the total monomer mixture, of unsaturated cyclic formal and 0.1 to 10% by weight, calculated on the total monomer mixture, of saturated cyclic formal or ether are used, highly crystalline products are obtained, whereas with 40 to 59.9% by weight, calculated on the total monomer mixture of unsaturated cyclic formal or ether, amorphous elastic glass-clear products are obtained. The more voluminous the second comonomer, the lower is the crystallinity and the higher is the elasticity. The decrease in crystallinity can be well measured by means of X-rays.

Low molecular weight polymers which constitute waxes or oils can easily be obtained with the use of high concentrations of catalyst, that is about 0.1 to 1% by weight, calculated on the total monomer mixture.

The above statements are intended to indicate the wide limits within which the properties of the terpolymers obtained by the process of the invention may be varied, the incorporation of different comonomers having, of course, different effects on the properties of the terpolymers and the transitions being fluid", column 2, lines 25-52. However, no high dioxolane content polymers are specifically disclosed, although Schott et al do state that "(t)he cyclic ether or saturated cyclic formal is advantageously used in an amount of 59.9 to 0.1% by weight, calculated on the total monomer mixture", and only terpolymers are disclosed.

None of the aforementioned patents or the published Japanese patent application teach trioxane/1,3-dioxolane copolymers which exhibit non-crystalline behavior at or above room temperature and low glass transition temperatures, or the use of such low Tg non-crystalline copolymers as impact property improvers for crystalline oxymethylene homo-, co- and terpolymers.

SUMMARY OF THE INVENTION

It has now been discovered, quite unexpectedly given the great number of prior art disclosures of acetal copolymers and the length of time that acetal copolymers have been known and used, that trioxane/1,3-dioxolane copolymers having a dioxolane content greater than 65 mol percent and less than about 75 mol percent, and particularly a dioxolane content of about 70 mol percent (these mol percentages being based on the total mols of trioxane and 1,3-dioxolane present in the copolymer), and an intrinsic viscosity (IV) of from about 1.0 to about 2.3, e.g., an intrinsic viscosity greater than about 1.0, such as 1.5, as determined by standard viscometric measurements, e.g., in o-chlorophenol, exhibit reduced melting points as compared to trioxane/dioxolane copolymers having dioxolane contents lower than 65 mol percent or higher than about 75 mol percent.

In other words, the melting points of trioxane/dioxolane copolymers having dioxolane contents and IV's within the abovementioned ranges are at a minimum at or below room temperature (about 25° C.) in comparison to those of trioxane/dioxolane copolymers having dioxolane contents outside the 65 mol percent to about 75 mol percent range.

Because the copolymers of this invention melt at or below room temperature, crystallites do not form in them. Thus, these non-crystalline polymers have a clear or translucent appearance. In addition, the suppression of crystallinity in such copolymers as a consequence of their dioxolane content continues even at temperatures below room temperature. As a result, such copolymers have a glass transition temperature at less than about −60° C., e.g., at about −65° C. And since low Tg favors improved impact properties, the novel low Tg non-crystalline trioxane/1,3-dioxolane copolymers of this invention find particular utility in blends with conventionally prepared crystalline oxymethylene homo-, co- and terpolymers, which blends exhibit improved impact properties in comparison to the unmodified crystalline polymers.

It is therefore an object of this invention to provide novel acetal copolymers.

It is also an object of this invention to provide novel low Tg non-crystalline copolymers of trioxane and 1,3-dioxolane having higher dioxolane contents than hitherto contemplated in the prior art.

A further object of this invention is to provide novel blends of the novel low Tg non-crystalline trioxane/1,3-dioxolane copolymers of this invention with conventionally prepared crystalline oxymethylene homo-, co- and terpolymers, which blends exhibit improved impact properties in comparison to those of the crystalline oxymethylene polymer component itself.

Another object of this invention is to provide articles molded from crystalline oxymethylene homo-, co- and terpolymers blended with the novel low Tg non-crystalline trioxane/1,3-dioxolane copolymers of this invention, which articles exhibit improved impact properties in comparison to those exhibited by the unmodified crystalline oxymethylene polymers themselves.

These and other objects, as well as the nature, scope and utilization of this invention, will become readily apparent to those skilled in the art from the following description and the appended claims.

DETAILED DESCRIPTION OF THE INVENTION

The Novel Low Tg Non-Crystalline Copolymers

The novel low Tg non-crystalline trioxane/1,3-dioxolane copolymers of this invention are preferably prepared by bulk polymerizing a solution of trioxane dissolved in from at least 65 mol percent to about 75 mol percent, e.g., about 70 mol percent, of 1,3-dioxolane, these mol percentages being based on the total mols of trioxane and 1,3-dioxolane present as the reaction mixture. The reaction will be carried out under an inert atmosphere, e.g., one obtained using dry nitrogen, argon, or the like, or a mixture of inert gases, in the presence of a catalytically effective amount of a cationic polymerization catalyst, such as p-nitrobenzenediazoniumfluoroborate, trifluoromethane sulfonic acid, boron trifluoride, a boron trifluoride etherate, or the like, e.g., an amount ranging from about $1 \times 10^{-4}$ M/l to about $5 \times 10^{-3}$ M/l and preferably from about $1 \times 10^{-3}$ M/l to about $1.5 \times 10^{-3}$ M/l, based on the volume of the reaction medium (reactants plus any solvents or suspending agents employed).

The polymerization reaction will usually be carried out at a temperature of from about 15° to about 30° C., and preferably at from about 20° to about 25° C., at pressures ranging from about 750 to about 770 psi, for from about 15 to about 30 hours, preferably for from about 20 to about 25 hours.

These polymers can also be prepared under the foregoing conditions by polymerizing trioxane and 1,3-dioxolane in a solvent, solvent mixture or suspending agent for the monomers, e.g., a halogenated hydrocarbon such as methylene chloride, a hydrocarbon such as hexane, cyclohexane, nonane or dodecane, an ether, or the like, or a mixture of two or more of these or other suitable solvents or suspending agents.

Crystalline Oxymethylene Polymers With Which the Novel Low Tg Non-Crystalline Copolymers Can Be Blended Crystalline oxymethylene polymers useful in preparing the blends of this invention are well known in the art. Such polymers are characterized in general as having recurring oxymethylene groups or units. The term oxymethylene polymer as used herein is intended to include any oxymethylene polymer having oxymethylene groups which comprise at least about 50 percent, and generally at least about 85 percent, of the polymer's recurring units, i.e., homopolymers, copolymers, terpolymers and the like.

Typically, oxymethylene homopolymers, or polyformaldehydes or [poly(oxymethylenes)], are prepared by polymerizing anhydrous formaldehyde or trioxane, a cyclic trimer of formaldehyde. For example, high molecular weight polyoxymethylenes have been prepared by polymerizing trioxane in the presence of certain fluoride catalysts, such as antimony fluoride. Polyoxymethylenes may also be prepared in high yields and at rapid reaction rates by the use of catalysts comprising boron fluoride coordination complexes with organic compounds, as described in U.S. Pat. No. 2,898,506 to Hudgin et al.

Oxymethylene homopolymers are usually stabilized against thermal degradation by end-capping with, for example, ester or ether groups such as those derived from alkanoic anhydrides, e.g., acetic anhydride, or dialkyl ethers, e.g., dimethyl ether, or by incorporating stabilizer compounds into the homopolymer, as described in U.S. Pat. No. 3,133,896 to Dolce et al.

Oxymethylene copolymers which are especially suitable for use in the blends of this invention will usually possess a relatively high level of polymer crystallinity, i.e., about 70 to 80 percent or higher. These preferred oxymethylene copolymers have repeating units which consist essentially of oxymethylene groups interspersed with oxy(higher)alkylene groups represented by the general formula:

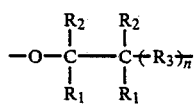

wherein each $R_1$ and $R_2$ is hydrogen or a lower alkyl group, each $R_3$ is a methylene, oxymethylene, lower alkyl-substituted methylene or lower alkyl-substituted oxymethylene group, and n is an integer from zero to three, inclusive. Each lower alkyl group preferably contains one or two carbon atoms.

Oxymethylene groups generally will constitute from about 85 to about 99.9 percent of the recurring units in such copolymers. The oxy(higher)alkylene groups incorporated into the copolymer during copolymerization produce the copolymer by the opening of the ring of a cyclic ether or cyclic formal having at least two adjacent carbon atoms, i.e., by the breaking of an oxygen-to-carbon linkage.

Copolymers of the desired structure may be prepared by polymerizing trioxane together with from about 0.1 to about 15 mol percent of a cyclic ether or cyclic formal having at least two adjacent carbon atoms, preferably in the presence of a catalyst such as a Lewis acid (e.g., $BF_3$, $PF_5$, and the like) or other acids (e.g., $HClO_4$, 1% $H_2SO_4$, and the like), ion pair catalysts, etc.

In general, the cyclic ethers and cyclic formals employed in making these preferred oxymethylene copolymers are those represented by the general formula:

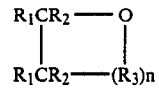

wherein each $R_1$ and $R_2$ is hydrogen or a lower alkyl group, each $R_3$ is a methylene, oxymethylene, lower alkyl-substituted methylene or lower alkyl-substituted oxymethylene group, and n is an integer from zero to three, inclusive. Each lower alkyl group preferably contains one or two carbon atoms.

The cyclic ether and cyclic formal preferred for use in preparing these preferred oxymethylene copolymers are ethylene oxide and 1,3-dioxolane, respectively. Among the other cyclic ethers and cyclic formals that may be employed are 1,3-dioxane, trimethylene oxide, 1,2-propylene oxide, 1,2-butylene oxide, 1,3-butylene oxide, 1,4-butanediol formal, and the like.

Oxymethylene copolymers produced from the preferred cyclic ethers have a structure composed substantially of oxymethylene and oxy(lower)alkylene, preferably oxyethylene, groups, and are thermoplastic materials having a melting point of at least 150° C. They normally are millable or processable at temperatures ranging from 180° C. to about 200° C., and have a number average molecular weight of at least 10,000 and an inherent viscosity of at least 1.0 (measured at 60° C. in a 0.1 weight percent solution in p-chlorophenol containing 2 weight percent of α-pinene).

These oxymethylene copolymers preferably are stabilized to a substantial degree prior to incorporating them into the blends of this invention. This can be accomplished by degradation of unstable molecular ends of the polymer chains to a point where a relatively stable carbon-to-carbon linkage exists at each end of each chain. Such degradation may be effected by hydrolysis, as disclosed, for example, in U.S. Pat. No. 3,219,623 to Berardinelli.

The oxymethylene copolymer may also be stabilized by end-capping, again using techniques well known to those skilled in the art. End-capping is preferably accomplished by acetylation with acetic anhydride in the presence of sodium acetate catalyst.

A particularly preferred class of oxymethylene copolymers is commercially available from Hoechst Celanese Corporation under the designation CELCON® acetal copolymer, and especially preferred is CELCON®M25 acetal copolymer, which has a melt index of about 2.5 g/10 min. when tested in accordance with ASTM D1238-82.

Oxymethylene terpolymers having oxymethylene groups, oxy(higher)alkylene groups such as those corresponding to the above-recited general formula:

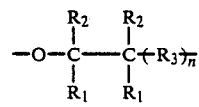

and a different, third group interpolymerizable with oxymethylene and oxy(higher)alkylene groups may be prepared, for example, by reacting trioxane, a cyclic ether or cyclic acetal and, as the third monomer, a bifunctional compound such as a diglycide of the formula:

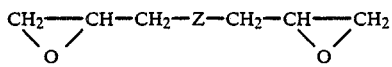

wherein Z represents a carbon-to-carbon bond, an oxygen atom, an oxyalkoxy group of 1 to 8 carbon atoms, inclusive, preferably 2 to 4 carbon atoms, an oxycycloalkoxy group of 4 to 8 carbon atoms, inclusive or an oxypoly(lower alkoxy)group, preferably one having from 2 to 4 recurring lower alkoxy groups each with 1 or 2 carbon atoms, for example, ethylene diglycide, diglycidyl ether and diethers of 2 mols of glycide and 1 mol of an aliphatic diol with 2 to 8 carbon atoms, advantageously 2 to 4 carbon atoms, or a cycloaliphatic diol with 4 to 8 carbon atoms.

Examples of suitable bifunctional compounds include the diglycidyl ethers of ethylene glycol; 1,4-butanediol; 1,3-butanediol; cyclobutane-1,3-diol; 1,2-propanediol; cyclohexane-1,4-diol and 2,2,4,4-tetramethylcyclobutane-1,3-diol, with butanediol diglycidyl ethers being most preferred.

Generally, when preparing such terpolymers, ratios of from 99.89 to 89.0 weight percent trioxane, 0.1 to 10 weight percent of the cyclic ether or cyclic acetal and 0.01 to 1 weight percent of the bifunctional compound are preferred, these percentages being based on the total weight of monomers used in forming the terpolymer. Ratios of from 99.85 to 89.5 weight percent of trioxane, 0.1 to 10 weight percent of cyclic ether or cyclic acetal and 0.05 to 0.5 weight percent of diglycidyl ether are particularly preferred, these percentages again being based on the total weight of monomers used in forming the terpolymer.

Terpolymer polymerization may be carried out according to known methods of solid, solution or suspension polymerization. As solvents or suspending agents, one may use inert aliphatic or aromatic hydrocarbons, halogenated hydrocarbons or ethers.

Trioxane-based terpolymer polymerization is advantageously carried out at temperatures at which trioxane does not crystallize out, that is, at temperatures within the range of from about −50° C. to about +100° C.

Cationic polymerization catalysts, such as organic or inorganic acids, acid halides and, preferably, Lewis acids, can be used in preparing the terpolymers. Of the latter, boron fluoride and its complex compounds, for example, etherates of boron fluoride, are advantageously used. Diazonium fluoroborates are particularly advantageous.

Catalyst concentration may be varied within wide limits, depending on the nature of the catalyst and the intended molecular weight of the terpolymer. Thus, catalyst concentration may range from about 0.0001 to about 1 weight percent, and preferably will range from about 0.001 to about 0.1 weight percent, based on the total weight of the monomer mixture.

Since catalysts tend to decompose the terpolymer, the catalyst is advantageously neutralized immediately after polymerization using, for example, ammonia or methanolic or acetonic amine solutions.

Unstable terminal hemiacetal groups may be removed from the terpolymers in the same manner as they are from other oxymethylene polymers. Advantageously, the terpolymer is suspended in aqueous ammonia at temperatures within the range of from about 100° C. to about 200° C., if desired in the presence of a swelling agent such as methanol or n-propanol. Alternatively, the terpolymer is dissolved in an alkaline medium at temperatures above 100° C. and subsequently reprecipitated. Suitable alkaline media include benzyl alcohol, ethylene glycol monoethyl ether, or a mixture of 60 weight percent methanol and 40 weight percent water containing ammonia or an aliphatic amine.

The terpolymers may also be thermally stabilized by degrading unstable molecular ends of their chains to a point where a relatively stable carbon-to-carbon linkage exists at each end of each chain. Thermal stabilization will preferably be carried out in the absence of a solvent in the melt, in the presence of a thermal stabilizer.

Alternatively, the terpolymer can be subjected to heterogeneous hydrolysis wherein water, with or without a catalyst, e.g, an aliphatic or aromatic amine, is added to a melt of the terpolymer in an amount ranging from about 1 to about 50 percent by weight, based on the weight of the terpolymer. The resulting mixture is maintained at a temperature in the range of from about 170° C. to 250° for a specified period of time, and then washed with water and dried or centrifuged.

A preferred oxymethylene terpolymer is commercially available from Hoechst Celanese Corporation under the designation CELCON ®U10 acetal polymer, and is a butanediol diglycidyl ether/ethylene oxide/trioxane terpolymer containing about 0.05 weight percent, 2.0 weight percent, and 97.95 weight percent of repeating units derived from these termonomers, respectively, based on the total weight of these termonomers.

Crystalline oxymethylene polymers admixed with plasticizers, formaldehyde scavengers, mold lubricants, antioxidants, fillers, colorants, reinforcing agents, light stabilizers and other stabilizers, pigments, and the like, can be used in the blends of this invention so long as such additives do not materially affect such blends' desired properties, particularly enhancement of impact strength, as manifested in articles molded therefrom. Such additives can be admixed with the novel low Tg non-crystalline copolymer, the crystalline oxymethylene polymer or the blend of two using conventional mixing techniques.

Suitable formaldehyde scavengers include cyanoguanidine, melamine and melamine derivatives, such as lower alkyl- and amine-substituted triazines, amidines, polyamides, ureas, metal oxides and hydroxides, such as calcium hydroxide, magnesium hydroxide, and the like, salts of carboxylic acids, and the like. Cyanoguanidine is the preferred formaldehyde scavenger. Suitable mold lubricants include alkylene bisstearamides, long-chain amides, waxes, oils, and polyether glycides. A preferred mold lubricant is commercially available from Glycol Chemical, Inc. under the designation Acrawax C, and is an alkylene bisstearamide. The preferred antioxidants are hindered bisphenols. Especially preferred is 1,6-hexamethylene bis-(3,5-di-t-butyl-hydroxyhydrocinnamate), commercially available from Ciba-Geigy Corp. under the designation Irganox 259.

A most preferred oxymethylene copolymer for use in the blends of this invention is commercially available from Hoechst Celanese Corporation under the designation CELCON®M25-04 acetal polymer. This oxymethylene copolymer has a melt index of about 2.5 g/10 min. and contains 0.5 percent by weight Irganox 259, 0.1 percent by weight cyanoguanidine, and 0.2 percent by weight Acrawax C.

A most preferred oxymethylene terpolymer for use in the blends of this invention is commercially available from Hoechst Celanese Corporation under the designation CELCON®U10-11 acetal polymer. This is the previously mentioned CELCON®U-10 acetal terpolymer stabilized by 0.5 percent by weight Irganox 259 and 0.1 percent by weight calcium ricinoleate.

The blends of novel low Tg non-crystalline trioxane/1,3-dioxolane copolymer and crystalline oxymethylene homo-, co- or terpolymer of this invention may be prepared by any conventional procedure that will result in a substantially uniform blend or admixture of the components. Preferably, dry or melt blending procedures and equipment are used. The low Tg non-crystalline copolymer, which can range from a dry solid to a slightly tacky material, can be dry mixed with the oxymethylene polymer (in the form of pellets, chips, flakes, granules or powder), typically at room temperature (about 25° C.), and the resulting mixture melt blended in any conventional type extrusion equipment, which is customarily heated to a temperature of from about 170° C. to about 220° C., and preferably from about 190° C. to about 210° C. The sequence of addition of the components is not critical, and any conventional means may be used to form the substantially uniform admixture.

Preferably, the low Tg non-crystalline copolymer and the oxymethylene polymer are dried (either individually or together) before being subjected to the blending procedure. Drying can be done in desiccated air having a dew point of about −30° C. to −40° C. or lower, at a temperature of from about 70° C. to about 110° C. The drying time will depend primarily on the moisture content, drying temperature, and particular equipment employed, but typically will be from about 2 to about 6 hours or more. If drying is conducted for longer periods of time, such as overnight, the drying temperature should preferably be about 70° C. to about 85° C. In general, any conventional drying procedure can be used to reduce the moisture content to below about 0.1 weight percent, based on the total weight of the low Tg non-crystalline copolymer and the oxymethylene polymer, preferably below about 0.05 weight percent, and most preferably below about 0.01 weight percent.

If conventional mold lubricants, plasticizers, fillers (particularly glass in the form of filaments or strands, beads, dust or microbubbles, any of which forms can be sized or otherwise combined with coupling agents), nucleating agents, antioxidants, formaldehyde scavengers, chain scission inhibitors, ultraviolet light inhibitors and similar molding additives have not previously been added to the low Tg non-crystalline copolymer or the oxymethylene polymer during the processing of these individual components of the blend, i.e., before they are admixed with each other, they may be added at this time.

The uniform admixture resulting from the blending procedure is then comminuted mechanically, for example by chopping, pelletizing or grinding, into granules, pellets, chips, flakes or powders, and processed in the thermoplastic state, for example by injection molding or extrusion molding into shaped articles, including bars, rods, plates, sheets, films, ribbons, tubes, and the like.

Preferably, the comminuted blend is dried again, in the manner discussed above, prior to being molded.

In order that those skilled in the art can more fully understand this invention, the following examples are set forth. These examples are given solely for purposes of illustration, and should not be considered as expressing limitations unless so set forth in the appended claims. All parts and percentages are by weight, unless otherwise stated.

EXAMPLE I

One hundred twenty-five ml of 1,3-dioxolane and 75 ml of freshly distilled trioxane are injected into a clean, dry 500 ml round bottom flask which is purged with dry nitrogen gas and held at room temperature (about 25° C.). Next, $1 \times 10^{-3}$ mol/liter of p-nitrobenzene-diazoniumfluoroborate as a solution in nitromethane is injected into the flask. The monomer solution becomes viscous over an approximately 1.5 hour period. Polymerization is allowed to continue overnight.

The flask is then broken at liquid nitrogen temperature and the viscous polymer mass is removed and admixed with 200 ml of methylene dichloride in a 1000 ml beaker. This mixture is then allowed to shake for 24 hours on a shake table. The resulting viscous solution is added to 1000 ml of cold ethanol and stirred with a mechanical shaft stirrer at 400 rpm for 1–2 hours.

The resulting two-phase mixture is placed in an ice bath and let stand for 2 hours, after which time a white, viscous polymer mass settles. The ethanol is decanted and the polymer mass is then dried in a hood.

NMR analysis indicates that the polymer contains 27 mol percent trioxane and 73 mol percent 1,3-dioxolane. The polymer has the following physical properties:
Melting Point 22° C.
IV 2.0
Tg (determined by Differential Scanning Calorimetry) −65° C.

EXAMPLE II

Blends of the trioxane/1,3-dioxolane copolymer prepared as described in Example I above with 15, 20, 25 and 30%, based on the total weight of the blend, of CELCON® acetal copolymer (Hoechst Celanese Corporation) are prepared by mixing the respective materials, after drying overnight at 75° C., at room temperature and then blending the resulting uniform mixtures in a Brabender-type mixer at 190°–210° C.

Improved impact strength molding resins are obtained.

The above discussion of this invention is directed primarily to preferred embodiments and practices thereof. It will be readily apparent to those skilled in the art that further changes and modifications in the actual implementation of the concepts described herein can easily be made without departing from the spirit and scope of the invention as defined by the following claims.

We claim:

1. A low Tg non-crystalline copolymer of trioxane and 1,3-dioxolane having a 1,3-dioxolane content greater than 65 mol percent and less than about 75 mol percent, said percentages being based on the total mols of trioxane and 1,3-dioxolane present in said copolymer, and an intrinsic viscosity of from about 1.0 to about 2.3.

2. A copolymer as recited in claim 1 having an intrinsic viscosity greater than about 1.0.

3. A copolymer as recited in claim 1 having a glass transition temperature at less than about −60° C.

4. A copolymer as recited in claim 1 having a glass transition temperature at about −65° C.

5. A copolymer as recited in claim 1 having a 1,3-dioxolane content of about 70 mol percent, an intrinsic viscosity greater than about 1.0 and a glass transition temperature at about −65° C.

6. A blend of:
(a) a low Tg non-crystalline copolymer of trioxane and 1,3-dioxolane having a 1,3-dioxolane content greater than 65 mol percent and less than about 75 mol percent, said percentages being based on the total mols of trioxane and 1,3-dioxolane present in said copolymer, and an intrinsic viscosity of from about 1.0 to about 2.3, and
(b) a crystalline oxymethylene polymer.

7. A blend as recited in claim 6 wherein said low Tg non-crystalline copolymer has an intrinsic viscosity greater than about 1.0.

8. A blend as recited in claim 6 wherein said low Tg non-crystalline copolymer has a glass transition temperature at less than about −60° C.

9. A blend as recited in claim 6 wherein said low Tg non-crystalline copolymer has a glass transition temperature at about −65° C.

10. A blend as recited in claim 6 wherein said low Tg non-crystalline copolymer has a 1,3-dioxolane content of about 70 mol percent, an intrinsic viscosity greater than about 1.0 and a glass transition temperature at about −65° C.

11. A blend as recited in any one of claims 6–10, inclusive, wherein said crystalline oxymethylene polymer is one in which oxymethylene groups comprise at least about 85 percent of the polymer's recurring units.

12. A blend as recited in claim 11 wherein said crystalline oxymethylene polymer is an end-capped oxymethylene homopolymer.

13. A blend as recited in claim 11 wherein said crystalline oxymethylene polymer is an oxymethylene copolymer having oxymethylene groups interspersed with oxy(higher)alkylene groups represented by the general formula:

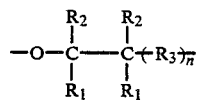

wherein each $R_1$ and $R_2$ is hydrogen or a lower alkyl group, each $R_3$ is a methylene, oxymethylene, lower alkyl-substituted methylene or lower alkyl-substituted oxymethylene group, and n is an integer from zero to three, inclusive.

14. A blend as recited in claim 13 wherein said crystalline oxymethylene polymer is an oxymethylene copolymer consisting essentially of oxymethylene groups interspersed with oxy(higher)alkylene groups represented by said general formula.

15. A blend as recited in claim 14 wherein said crystalline oxymethylene polymer is a copolymer of trioxane and ethylene oxide.

16. A blend as recited in claim 14 wherein said crystalline oxymethylene polymer is a copolymer of trioxane and 1,3-dioxolane.

17. A blend as recited in claim 11 wherein said crystalline oxymethylene polymer is an oxymethylene terpolymer.

18. A blend as recited in claim 17 wherein said terpolymer is one having oxymethylene groups, oxy(higher)alkylene groups represented by the general formula:

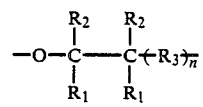

wherein each $R_1$ and $R_2$ is hydrogen or a lower alkyl group, each $R_3$ is a methylene, oxymethylene, lower alkyl-substituted methylene or lower alkyl-substituted oxymethylene group, and n is an integer from zero to three, inclusive, and a different, third group interpolymerizable with oxymethylene and oxy(higher)alkylene groups.

19. A blend as recited in claim 18 wherein said different, third group is a bifunctional group.

20. A blend as recited in claim 19 wherein said bifunctional group is derived from a diglycide of the general formula:

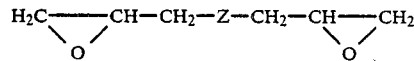

wherein Z represents a carbon-to-carbon bond, an oxygen atom, an oxyalkoxy group of 1 to 8 carbon atoms, inclusive, an oxycycloalkoxy group of 4 to 8 carbon atoms, inclusive, or an oxypoly(lower alkoxy) group having 2 to 4 recurring lower alkoxy groups each with 1 or 2 carbon atoms.

21. A blend as recited in claim 17 wherein said crystalline oxymethylene polymer is a terpolymer of trioxane, ethylene oxide and butanediol diglycidyl ether.

* * * * *